United States Patent
Mok et al.

(10) Patent No.: US 7,619,395 B2
(45) Date of Patent: Nov. 17, 2009

(54) END-POINT PREDICTION SCHEME FOR VOLTAGE REGULATORS

(75) Inventors: Kwok Tai Philip Mok, Hong Kong (HK); Man Siu, Hong Kong (HK); Ka Nang Leung, Hong Kong (HK)

(73) Assignee: The Hong Kong University of Science and Technology, Hong Kong (CN)

( * ) Notice: Subject to any disclaimer, the term of this patent is extended or adjusted under 35 U.S.C. 154(b) by 222 days.

(21) Appl. No.: 11/457,401

(22) Filed: Jul. 13, 2006

(65) Prior Publication Data

US 2007/0013354 A1 Jan. 18, 2007

Related U.S. Application Data

(60) Provisional application No. 60/699,890, filed on Jul. 18, 2005.

(51) Int. Cl.
*G05F 1/613* (2006.01)
(52) U.S. Cl. ........... 323/224; 323/282
(58) Field of Classification Search .......... 323/224, 323/282, 283, 284; 327/180; 331/17
See application file for complete search history.

(56) References Cited

U.S. PATENT DOCUMENTS

| | | | | |
|---|---|---|---|---|
| 5,644,270 A | * | 7/1997 | Moyer et al. | ............ 331/34 |
| 6,064,187 A | * | 5/2000 | Redl et al. | ............ 323/285 |

OTHER PUBLICATIONS

Siu et al., "A Voltage-Mode PWM Buck Regulator With End-Point Prediction," IEEE Transactions on Circuits and Systems—II: Express Briefs, vol. 53, No. 4, Apr. 2006, pp. 294-298.

* cited by examiner

*Primary Examiner*—Shawn Riley
(74) *Attorney, Agent, or Firm*—Schwabe Williamson & Wyatt P.C.

(57) ABSTRACT

An End-Point Prediction scheme is described for voltage-mode buck regulators to generate adaptive output voltage to integrated-circuit systems. Internal nodal voltages of the regulator controller are predicted and set automatically by the proposed algorithms and circuits. The settling time of the regulator can therefore be significantly reduced for faster dynamic responses, even with dominant-pole compensation.

27 Claims, 5 Drawing Sheets

| State | Q |
|---|---|
| $V_H < V_I$ | 1 |
| $V_L < V_I < V_H$ | $Q(t-1) = 1 \rightarrow Q(t) = 1$<br>$Q(t-1) = 0 \rightarrow Q(t) = 0$ |
| $V_I < V_L$ | 0 |

ID-POINT PREDICTION SCHEME FOR
VOLTAGE REGULATORS

CROSS-REFERENCE TO RELATED APPLICATION

This application claims the benefit of U.S. Provisional Application No. 60/699,890, filed Jul. 18, 2005, entitled "End-Point Prediction Scheme for Voltage Regulators," which application is incorporated in its entirety by reference as if fully set forth herein.

FIELD OF THE INVENTION

The invention is in the area of End-Point Prediction (EPP) that is a methodology to improve the reference-tracking speed of a regulator. This has important application on the design of regulators, such as buck regulators for generating adaptive output or supply voltages to integrated-circuit systems and other types of regulators.

BACKGROUND OF THE INVENTION

Adaptive power supply is an effective power-management solution for performance-power optimization in both digital and mixed-signal systems. Therefore, switched-mode regulators with fast reference tracking to provide fast change of regulated output voltages are becoming important for future IC systems. Pulse-width-modulated (PWM) switched-mode regulator is well-accepted in many mixed-signal systems, as the switching period is fixed and can be designed so that switching noise will not seriously degrade the signal-to-noise ratio of mixed-signal systems. However, PWM regulators generally have slower reference tracking due to the large and off-chip compensation capacitors for the regulator's stability. As a result, extensive parametric design on controller and compensation network is generally required to improve the tracking speed, and therefore the robustness of this approach is not high.

One type of a voltage-mode PWM buck regulator 10 to provide a regulated output voltage ($V_O$) from an unregulated voltage ($V_{IN}$) is shown in FIG. 1A, as disclosed in R. W. Erickson, *Fundamentals of Power Electronics*, Norwell Mass.: Kluwer Academic Publishers, 2001. The power stage 12 is formed by two power transistors (a PMOSFET: MP and a NMOSFET: MN), an inductor ($L_O$) and a filtering capacitor ($C_O$). The error amplifier 14 compares the reference voltage ($V_{REF}$) from a voltage reference 16 with scaled $V_O$ generated by resistors 20 and 22 of respective resistances $R_{F1}$ and $R_{F2}$. Thus, $$V_O = V_{REF}(R_{F1}+R_{F2})/R_{F2} = V_{REF}/b$$

where $b=R_{F2}/(R_{F1}+R_{F2})$. An error voltage ($V_a$) is then generated by error-amplifier 14 and supplied to PWM controller 24 to determine duty cycle (D) in a switching period for voltage regulation. A buck regulator operated in continuous conduction mode (CCM) has a conversion relationship given by $$\frac{V_O}{V_{IN}} = D = \frac{V_a - V_L}{V_H - V_L}$$

where $V_H$ and $V_L$ are upper and lower bounds of the ramp signal in the PWM controller 24. When $V_{REF}$ from reference 16 is changed, $V_O$ is changed by changing D with different $V_a$. This change in $V_O$ is then fed through an error-amplifier 14 and a compensation network 18 that includes an off-chip compensation capacitor ($C_C$) to the PWM controller 24. Since a large compensation capacitor ($C_C$) is connected at the error-amplifier output for frequency compensation, the large-signal response of $V_a$ is poor and the change of $V_O$ in the prior art is therefore very slow. A dead-time control and power transistor drivers circuit 26 containing one or more power transistor driver(s) may be used to drive the power stage 12, so that there is no overlap between the times when both transistors MP and MN are on at the same time. The operation of circuits 24 and 26 is conventional and need not be described herein in detail. While the network 18 is shown to contain a single capacitor, it will be understood that it may contain more than one capacitor and one or more resistors as well to achieve one or multiple pole-zero cancellations.

The effect of large capacitance of the compensation capacitor ($C_C$) in compensation network 18 on tracking speed of the regulator output voltage is illustrated in FIG. 1B. As shown in FIG. 1B, the large capacitance of the compensation capacitor ($C_C$) causes the error signal $V_a$ at the output of the error amplifier to rise slowly, so that the pulse width signal controlling the pulse width from the PWM controller 24 also causes the duty cycle (e.g. from $D_{n+1}$ to $D_{n+3}$ in FIG. 1B) and the regulator output voltage $V_O$ to rise slowly when $V_{REF}$ is abruptly increased. This is undesirable.

SUMMARY OF THE INVENTION

The invention is based on the recognition that, it is possible to anticipate the end-point value of the error voltage that should be applied to the controller controlling the duty cycle when the reference voltage $V_{REF}$ is changed, in a scheme referred to herein as end-point prediction. In this scheme tracking speed can be improved by providing the reference voltage to the controller that controls the duty cycle (D) of the power stage (such as by controlling the turning on and off of the stage) in a manner that bypasses the compensation network 18 that includes the large value compensation capacitor ($C_C$). A change in $V_{REF}$ will therefore be quickly reflected in a change in duty cycle (D) of the power stage, and in a corresponding change in $V_a$. In this manner, $V_a$ will quickly track a change in $V_{REF}$. This is the case even for large changes in the value of $V_{REF}$.

In one embodiment of the invention, the regulator comprises a power stage including two or more power semiconductor devices, said stage providing a regulator output in response to an input voltage. One or more power-transistor digital driver(s) turns on/off the power semiconductor devices to control the duty cycle (D) of the power stage. An error amplifier receives as inputs a reference voltage and a signal indicative of the regulator output and provides a single-ended output that is proportional to a difference between the two inputs to the error amplifier. A frequency compensation network connected to the amplifier output (or connected between the amplifier out and the negative input of the amplifier) to stabilize the regulator. A circuit path connects the voltage reference and the amplifier output or a signal derived therefrom to the controller that controls the duty cycle (D) of the power stage. The circuit path connects the reference voltage to the controller in a manner so that the path is substantially unaffected by any delay caused by the frequency compensation network, to provide end-point prediction when the voltage reference changes. Preferably, the path bypasses the frequency compensation network.

In one implementation of the above embodiment, the circuit path includes a voltage adder that adds the voltage reference and the amplifier output or a signal derived therefrom and provides the summed signal to the controller. Preferably, a voltage-controlled oscillator supplies substantially input voltage independent and substantially constant frequency ramp and clock signals for use by the controller. The voltage-controlled oscillator also supplies a ramp signal of amplitude $V_H$–$V_L$ directly proportional to the input voltage for use of the controller.

Another aspect of the invention is directed to an oscillator that can generate substantially input voltage independent and substantially constant frequency ramp and clock signals. In one embodiment, the oscillator comprises a current mirror circuit. The current mirror circuit includes a circuit providing a current I equal to $b(V_{IN})/R_1$, where $V_{IN}$ is an input voltage to the oscillator and b is a scaling factor less than or equal to one, and $R_1$ a resistance. The current mirror circuit also includes a first branch including a capacitor; and a second branch including a resistor of resistance $R_1$, said current mirror circuit being such that current I flows through both branches. The oscillator comprises a transistor connected in parallel to said capacitor and a hysteretic comparator providing a periodic clock signal to a gate of said transistor to periodically discharge said capacitor to provide a periodic ramp signal by turning on the transistor periodically, in response to voltages at two terminals of the resistor.

BRIEF DESCRIPTION OF THE DRAWINGS

An embodiment of the invention will now be described by the way of principles of operation and with reference to accompanying drawings, in which.

For simplicity and description, identical components are labeled by the same numerals or identification in this application.

DETAILED DESCRIPTION OF THE PREFERRED EMBODIMENT

In one embodiment, an adaptive output or supply voltage by a buck regulator 100 provides a good approach to save power of integrated-circuit systems. A low output voltage from the regulator is applied to a system in low-power/standby mode, while a high output voltage from the regulator will be applied when the system has to operate in full-power mode. The reference voltage is therefore changed at different modes of operation to vary the output or supply voltage from the buck regulator. The corresponding action by the buck regulator in response to the change of reference voltage is regarded as reference tracking. The reference-tracking speed is important and is preferably fast so that the transition time between low-power/standby mode and full-power mode is short. While the embodiment described involves a buck regulator, it will be understood that the invention is equally applicable to other types of regulators.

Figure 1A:
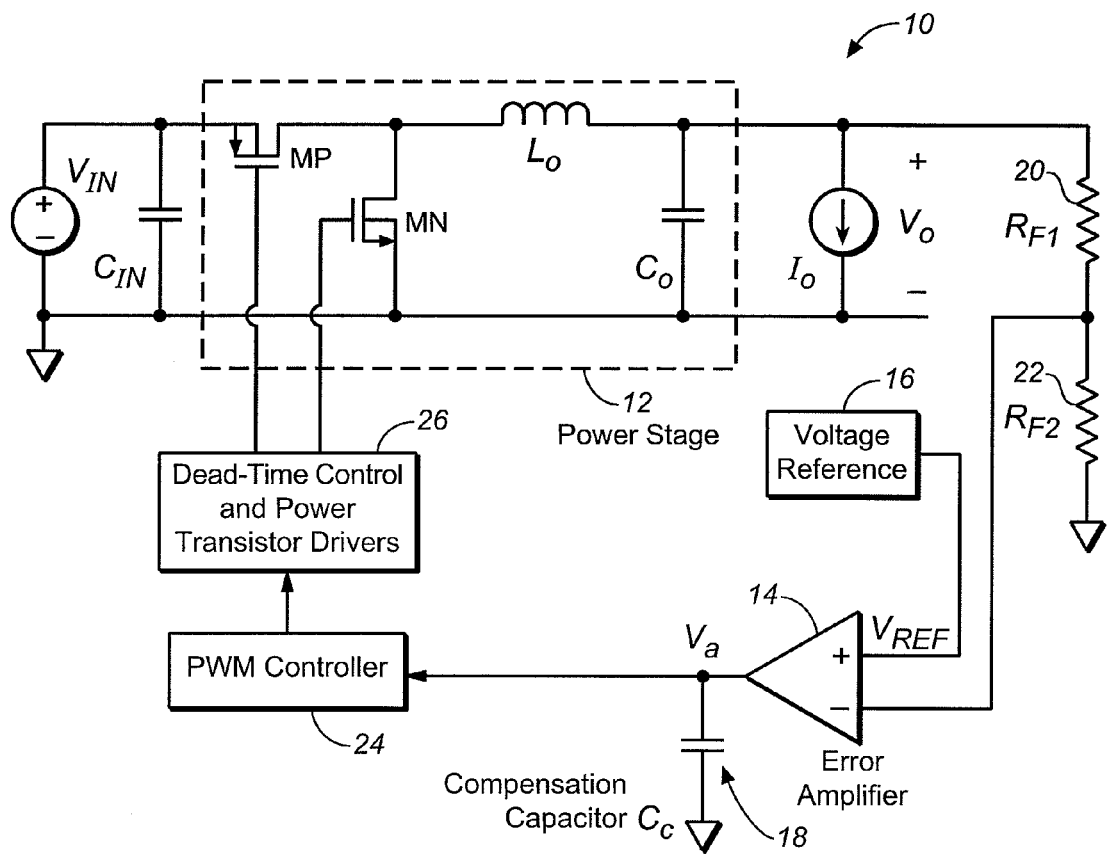
FIG. 1A is the block diagram illustrating a generic voltage-mode buck regulator according to the prior art.
Figure 1B:
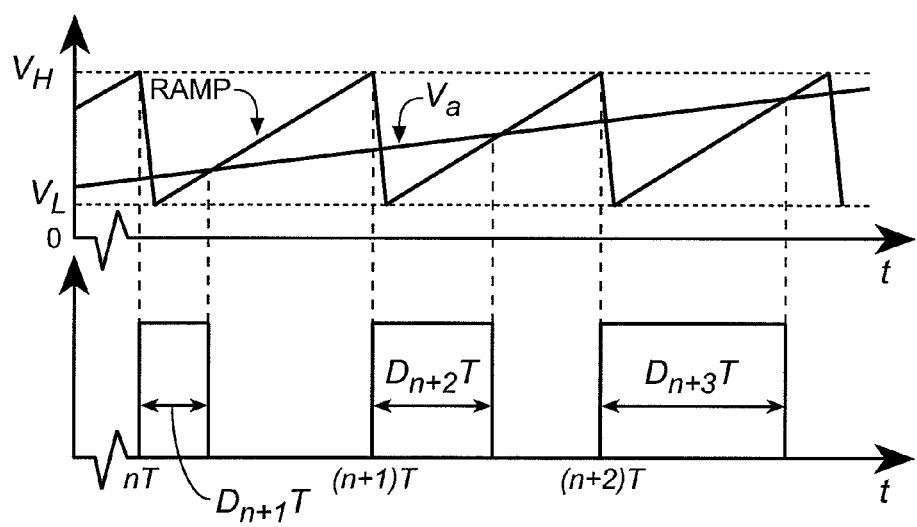
FIG. 1B is a graphical plot of a ramp signal and of an error voltage to illustrate the slow tracking in a conventional regulator.

In the prior art design of FIG. 1A, there is a large voltage change experienced at the error-amplifier output when the reference voltage is changed to generate different output voltage of the buck regulator. Dominant-pole compensation, which is a robust method to achieve regulator's stability, will slow down the overall response of the buck regulator due to slew-rate limit by the large compensation capacitor at the error-amplifier output.

Figure 2:
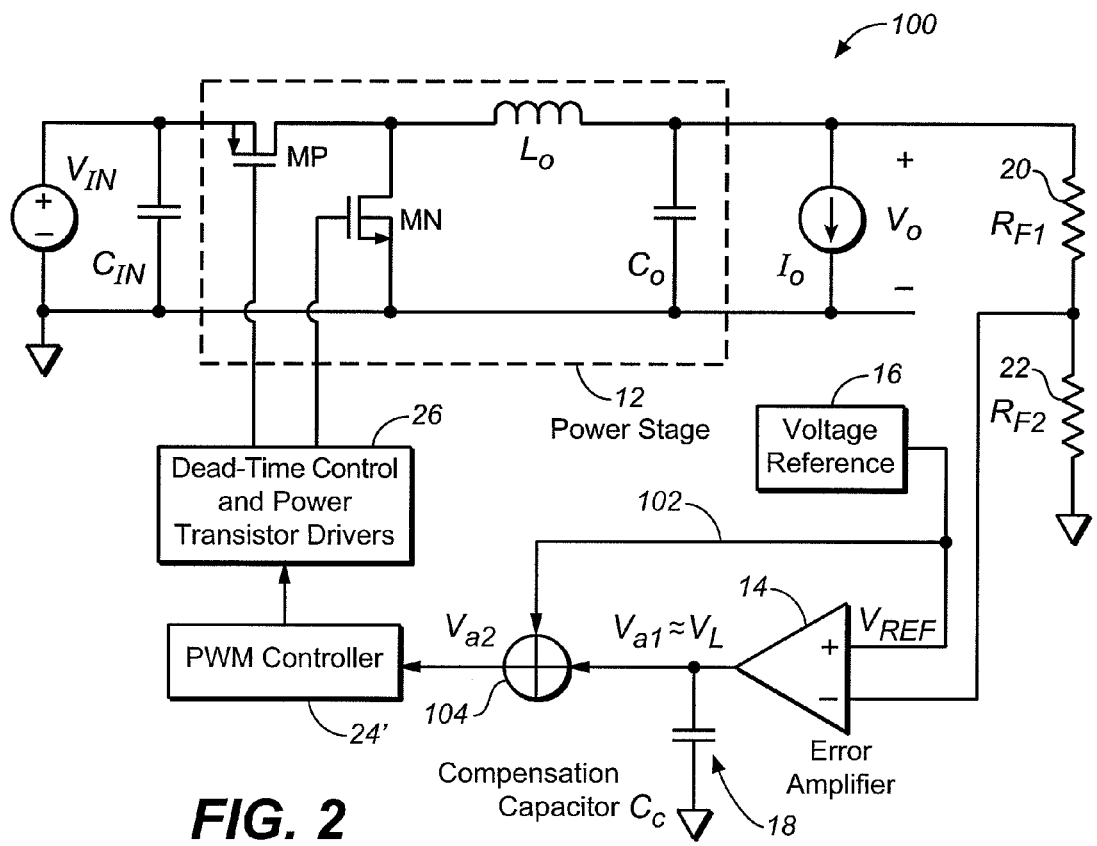
FIG. 2 is the block diagram illustrating the structure of a voltage-mode buck regulator according to an embodiment of the present invention.

To solve this problem, in one embodiment, the reference voltage is applied along a circuit path 102 that leads to controller 24' and that bypasses the capacitor of large capacitance $C_C$ in network 18, so that the rise time of the error signal applied to the controller is substantially unaffected by the capacitance. Preferably, the path includes a voltage adder 104 used to add the error-amplifier output voltage $V_{a1}$ and the reference voltage $V_{REF}$, as shown in FIG. 2, and the summed voltage signal $V_{a2}$ is fed to controller 24'. In this manner, a change in the reference voltage $V_{REF}$ is quickly reflected in a change in the error signal applied to controller 24', which causes a commensurate change in the duty cycle D. This then causes a corresponding change in the regulator output $V_O$. The voltage change at the error-amplifier output $V_{a1}$ is theoretically null while it varies just a little in practice. The reference-tracking speed is hence greatly improved.

In this case, $V_{a1}$, a node connected with a large compensation capacitor in network 18, need not experience large voltage transients during reference tracking. According to prior art, the required $V_a$ to determine D is given by $$V_a = \left(\frac{V_H - V_L}{bV_{IN}}\right) \cdot V_{REF} + V_L$$

When $V_H$ is designed such that $$V_H = bV_{IN} + V_L \text{ or } \frac{V_H - V_L}{bV_{IN}} = 1$$

wherein within tolerances, the relation of $V_a$ and $V_{REF}$ is given by $V_a = V_{REF} + V_L$ where $V_H$ and $V_L$ are provided by the PWM controller 24'.

Referring to FIG. 2, the error-amplifier output voltage $V_{a1}$ is substantially equal to $V_L$. During reference tracking, $V_{REF}$ and $V_{a2}$ will change rapidly while the error-amplifier output voltage $V_{a1}$ will be constant. However, this will be the case only when using ideal power transistors and ideal inductor. As a result, there will be a small change on $V_{a1}$ during tracking in practice. Since there is nearly no large-signal transient at $V_{a1}$, the reference tracking is much improved.

Hence, when the reference voltage $V_{REF}$ is changed, $V_{a2}$ will quickly change with it, thereby causing the duty cycle D controlled by controller 24' and output $V_O$ of stage 12 to also change quickly, tracking the change in the reference voltage at high speed.

Stability of power converters is studied by loop-gain analysis. The open-loop gain T(s) of a voltage-mode buck converter in CCM is given by $$T(s) = \left(\frac{b}{D}\right) \cdot \left[\frac{V_O}{(V_H - V_L)}\right] \cdot A(s) \cdot P(s)$$

where A(s) and P(s) are the transfer functions of the error amplifier 14 and power stage 12, respectively. As $V_H = bV_{IN} + V_L$ is used in the proposed EPP scheme, the loop gain of the proposed structure is given by $$T(s) = A(s) \cdot P(s)$$

The stability of the voltage-gain buck regulator is independent of $V_O$. Stability of the proposed buck regulator can be achieved by dominant-pole compensation. A low frequency pole, which ensures complex poles due by the power stage located after the unity-gain frequency of the loop gain, is created at the error-amplifier output.

Figure 3:
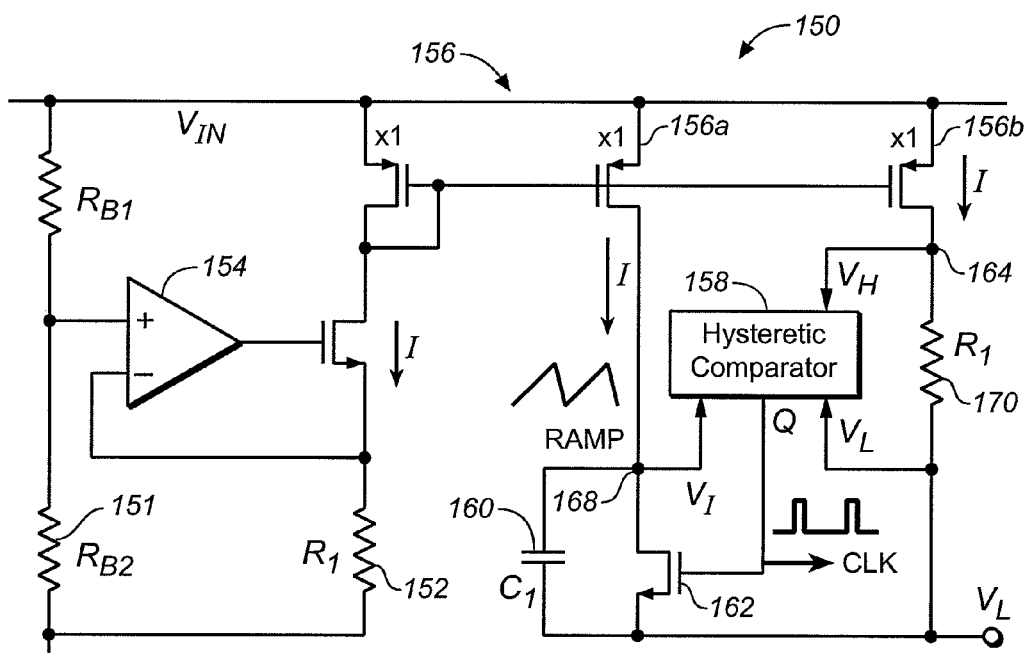
FIG. 3 is a schematic view of a voltage-controlled oscillator for use in an embodiment of the present invention.

As the input voltage $V_{IN}$ to the regulator changes, the frequency of the ramp signal in controller 24' may also change. As a further improvement, a voltage-controlled oscillator (VCO) is used in controller 24' to provide a ramp signal with $V_H = bV_{IN} + V_L$ and a substantially constant switching frequency despite changes in the input voltage $V_{IN}$ to the regulator. The ramp signal amplitude needs to change from $V_L$ to $V_H = bV_{IN} + V_L$ with a constant switching frequency. $V_L$ is provided by controller 24'. The VCO 150 design is shown in FIG. 3, which is one of the embodiments. When the resistor ratio $R_{B2}/(R_{B1}+R_{B2})$ of the VCO 150 is also designed as substantially b, which is defined as the ratio $R_{F2}/(R_{F1}+R_{F2})$, the current I in resistor 152 of resistance $R_1$ is given by $$I = bV_{IN}/R_1$$

Figures 4, 5:
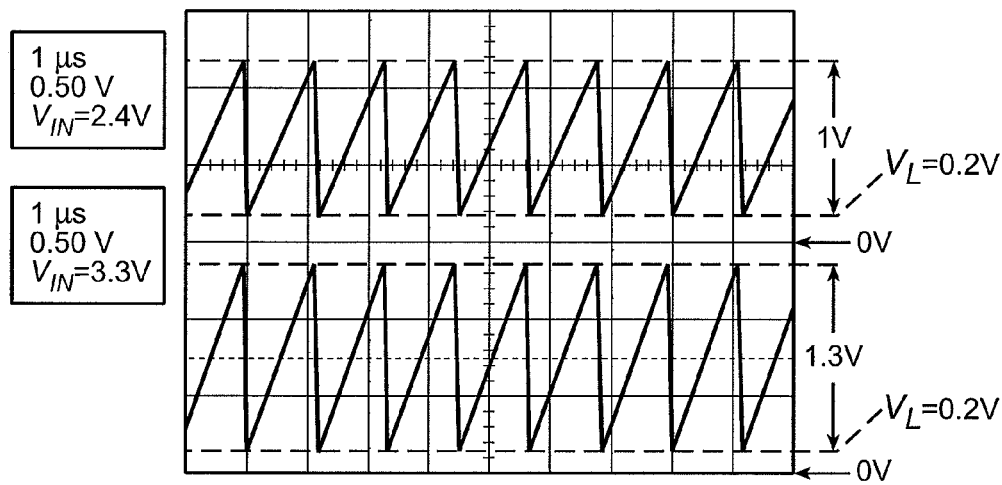
FIG. 4 is the logic of the hysteretic comparator in FIG. 3.
FIG. 5 is the measured results of the used voltage-controlled oscillator in FIG. 3 at two input voltages.

The voltages across resistors 151 and 152 are the same, due to the effect of amplifier 154. This current I is copied by the current mirror 156 into two current branches. One branch 156a is to charge a capacitor 160 of capacitance $C_1$ to form the ramp signal, while another branch 156b is used to convert the voltage at node 164 to $V_H$. The hysteretic comparator 158 with logics shown in FIG. 4 compares the amplitude of the ramp signal $V_I$ at node 168 with $V_H$ and $V_L$ at the two terminals of resistor 170 and at the two inputs of comparator 158 to turn on and off the NMOS transistor 162 that is connected in parallel with capacitor 160 of capacitance $C_1$ to discharge the ramp voltage back to $V_L$. The charge stored in capacitor 160 is given by $$Q = I/f = C_1 \cdot (V_H - V_L)$$

where f is the switching frequency of the designed buck converter, and hence $$bV_{IN}/(f \cdot R_1) = C_1 \cdot [(bV_{IN} + V_L) - V_L]$$

to give the relationship of switching frequency of $$f = 1/R_1 C_1$$

The switching frequency is therefore independent of $V_{IN}$ and is fixed by the design of $R_1$ and $C_1$, and the ramp amplitude changes between $V_L$ and $V_H = bV_{IN} + V_L$. Hence, VCO 150 provides a ramp signal and a clock signal that are substantially the same despite changes in $V_{IN}$. In the design, $V_L$ is set to about 0.2V so that $V_{a1} \approx 0.2V$ to allow the error amplifier to operate in the high-gain region. The voltage-controlled oscillator 150 also supplies a ramp signal of amplitude $V_H - V_L$ directly and substantially proportional to the input voltage $V_{IN}$ for use by the controller.

While the voltage controller oscillator circuit 150 of FIG. 3 can be advantageously used for the regulator of FIG. 2 for generating substantially constant frequency ramp and clock signals independent of the input voltage, it will be understood that circuit 150 may also be used for such similar purposes either alone or in combination with other circuits. Such and other variations are within the scope of this application.

Figure 6:
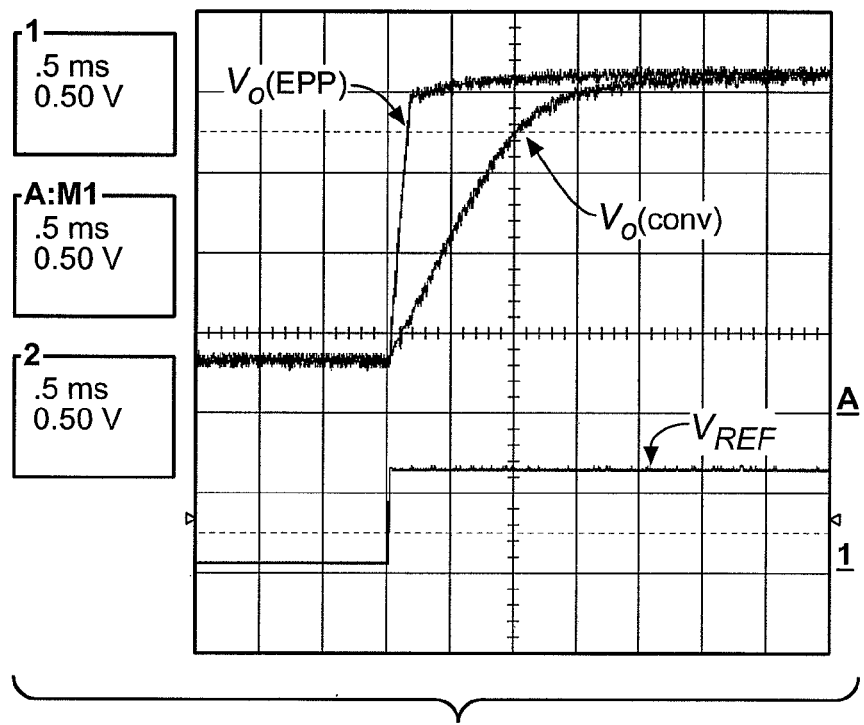
FIG. 6 is the reference tracking of the positive edge of $V_{REF}$ for $V_O$ by the conventional control of FIG. 1A.
Figure 7:
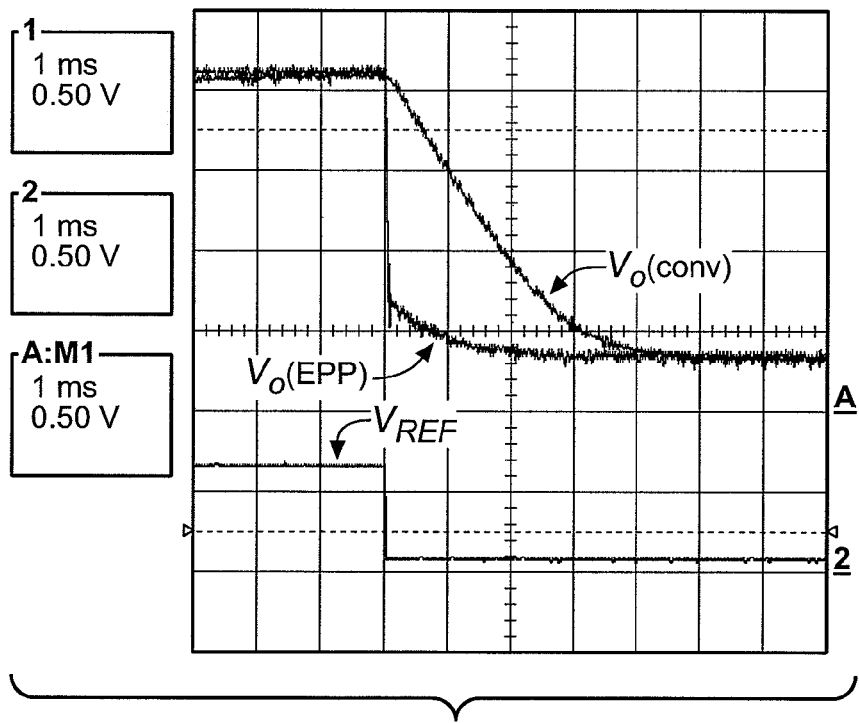
FIG. 7 is the reference tracking of the negative edge of $V_{REF}$ for $V_O$ by the control in an embodiment of the present invention.
Figure 8A:
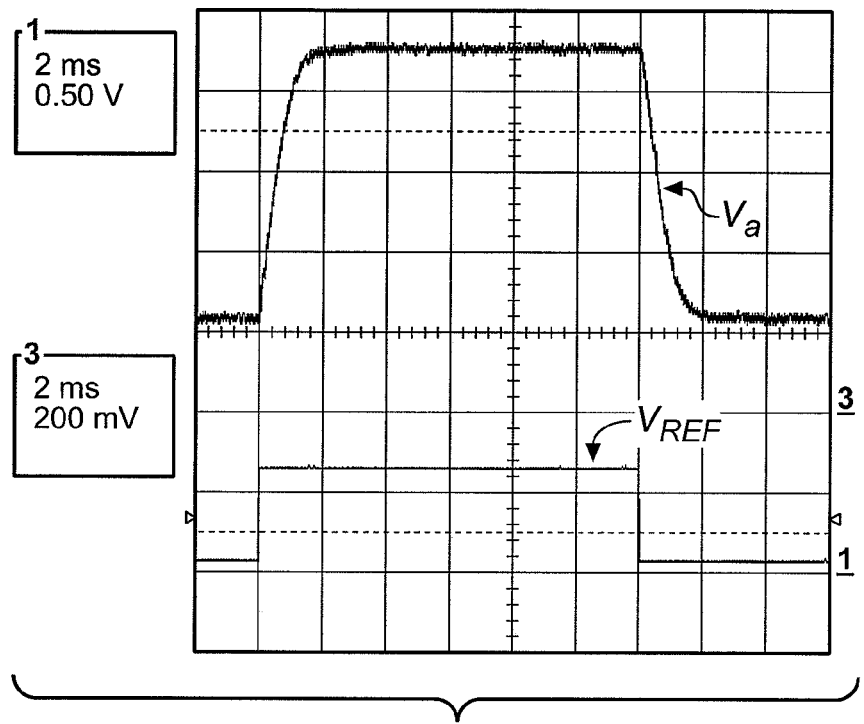
FIG. 8A is a graphical plot of the reference voltage $V_{REF}$ and of the error voltage output $V_a$ of the error-amplifier in the regulator of FIG. 1A.
Figure 8B:
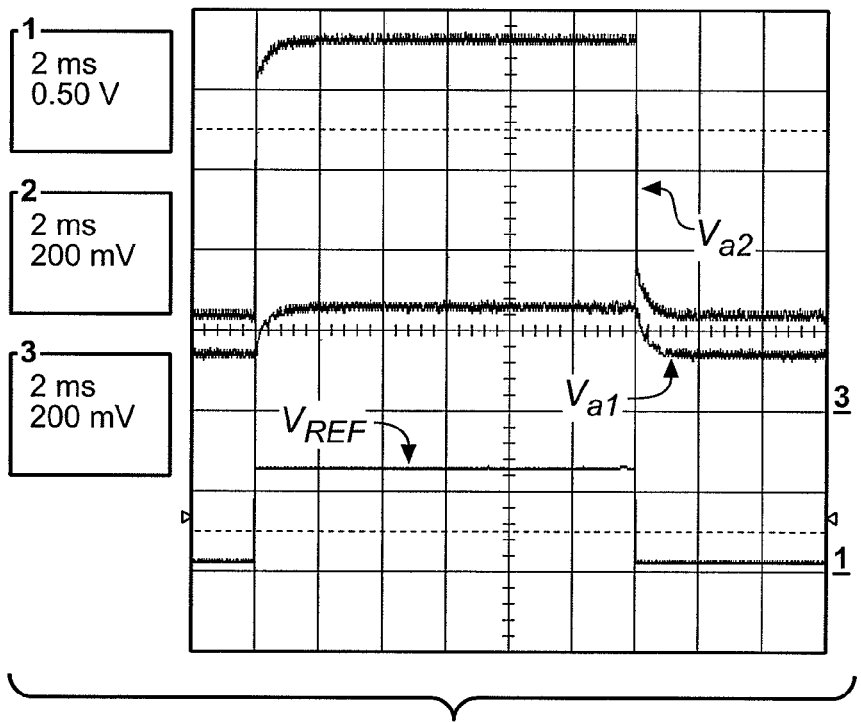
FIG. 8B is a graphical plot of the reference voltage $V_{REF}$ and of the error voltage output $V_{a1}$ of the error-amplifier, and the output $V_{a2}$ of an adder adding $V_{a1}$ to $V_{REF}$ in the regulator of FIG. 2.

A buck regulator in accordance with this embodiment of invention has been fabricated. FIG. 5 shows the measured ramp signals by the invented VCO at $V_{IN}=2.4V$ and $V_{IN}=3.3V$. The preset $V_L$ is 0.2V and b is set to ⅓. Therefore, $V_H$ is 1.2V and 1.5V, respectively, which agrees with the experimental results well using the stated algorithm. Thus, FIG. 5 illustrates the fact that the frequency of the ramp signal remains substantially unchanged despite changes in $V_{IN}$ and $V_H$ FIG. 6 and FIG. 7 show the reference tracking of both positive and negative edges of $V_{REF}$ for both $V_O$ by the conventional (e.g. that of FIG. 1A) and the EPP controls (that of FIG. 2), respectively. The tracking speed by EPP is faster than the conventional control. The signals in FIG. 8A shows $V_a$ (input of the PWM controller) for the conventional controls. As predicted, $V_a$ is slowed down by the large compensation capacitor in network 18 to generate new $V_O$ slowly in response to a change in $V_{REF}$. However, $V_{a2}$ in the EPP scheme of FIG. 2 changes much faster to provide a change in $V_O$ quickly as shown in FIG. 8B in response to a change in $V_{REF}$. It is noted that there is a small change on $V_{a1}$ due to the non-ideal power transistors and inductor on non-zero on-resistance and series-equivalent resistance. Since the change is small, it does not degrade the tracking speed significantly. Some of the aspects of the embodiment of this invention are also described in the article, "A Voltage-Mode PWM Buck Regulator With End-Point Prediction," Siu et al., IEEE Transactions on Circuits and Systems—II: Express Briefs, Vol. 53, No. 4, April 2006, pp. 294-298.

While the invention has been described above by reference to various embodiments, it will be understood that changes and modifications may be made without departing from the scope of the invention, which is to be defined only by the appended claims and their equivalent. All references referred to herein are incorporated herein by reference.

What is claimed is:

1. A regulator, comprising:

a power stage configured to provide a regulator output in response to an input voltage;

a controller coupled to the power stage and configured to control power to the power stage;

a reference voltage generator configured to generate a reference voltage;

an error amplifier coupled to the reference voltage generator, wherein the error amplifier is configured to receive, as inputs, the reference voltage and a signal indicative of the regulator output, and configured to provide a single-ended output proportional to a difference between the reference voltage and the signal indicative of the regulator output;

a frequency compensation network coupled to the error amplifier and configured to receive the amplifier output; and a circuit path coupling the reference voltage generator to the controller, wherein the circuit path is substantially unaffected by any delay caused by the frequency compensation network.

2. The regulator of claim 1, wherein the circuit path includes a voltage adder to sum the error-amplifier output, or a signal derived therefrom, and the reference voltage is further configured to obtain a sum signal and to supply the sum signal to the controller.

3. The regulator of claim 2, wherein the voltage adder is configured to operate in voltage mode or current mode.

4. The regulator of claim 1, further comprising a voltage-controlled oscillator to provide substantially constant frequency ramp and clock signals to the controller.

5. The regulator of claim 4, wherein the controller comprises a pulse-width-modulation controller.

6. The regulator of claim 5, wherein the pulse-width-modulation controller is configured to provide a second reference voltage, wherein the voltage-controlled oscillator is configured to generate the substantially constant frequency ramp and clock signals with voltage amplitude changing between voltages VH and VL, and wherein at least one of the voltages VH and VL are being derived from the second reference voltage.

7. The regulator of claim 6, wherein VH is greater than VL, VL is greater than 0V, VH=b*VIN+VL, VIN is an input voltage to the regulator, and b is a scaling factor less than or equal to one.

8. The regulator of claim 7, further comprising a voltage divider configured to provide a voltage substantially equal to b*VIN to one of two inputs to the error amplifier.

9. The regulator of claim 1, further comprising a voltage-controlled oscillator configured to provide a ramp voltage having an amplitude substantially proportional to the input voltage.

10. The regulator of claim 1, wherein the frequency compensation network comprises a single capacitor connected between the single-ended output and ground.

11. The regulator of claim 1, wherein the frequency compensation network comprises one or more resistors and one or more capacitors.

12. The regulator of claim 1, wherein the power stage comprises a power PMOSFET, a power NMOSFET, an inductor, and an output capacitor.

13. The regulator of claim 12, further comprising a dead-time control circuit configured to alternately power the power NMOSFET and the power PMOSFET such that they do not turn on at the same time.

14. The regulator of claim 1, further comprising one or more power transistor drivers coupled between the controller and the power stage and configured to drive the power stage.

15. The regulator of claim 1, wherein the power stage includes two or more power semiconductor devices.

16. A method, comprising:
regulating, by a regulator, an input voltage to produce an output voltage;
generating an error voltage signal based, at least in part, on a comparison of a reference voltage and a signal indicative of the output voltage;
supplying a feedback signal, derived from the error voltage signal and the reference voltage, to a controller; and
controlling a power stage of the regulator based, at least in part, on the feedback signal.

17. The method of claim 16, wherein said supplying includes summing the error signal, or a signal derived therefrom, and the reference voltage to obtain the feedback signal.

18. The method of claim 16, further comprising providing substantially constant frequency ramp and clock signals to the controller independent of changes in the input voltage.

19. The method of claim 16, wherein said controlling a power stage further comprises providing pulse-width-modulation signals to the power stage based, at least in part, on the feedback signal.

20. The method of claim 16, wherein the error voltage signal is generated by an error amplifier.

21. A voltage-controlled oscillator, comprising:
a current mirror circuit including:
a circuit configured to provide a current I proportional to an input voltage VIN and a resistance R1 multiplied by a scaling factor b;
a first output branch including a capacitor; and
a second output branch including a resistor of resistance R1;
wherein the current mirror circuit is configured to cause current I to flow through both branches;
a transistor coupled in parallel to the capacitor; and
a hysteretic comparator configured to provide a periodic clock signal to a gate of the transistor to cause the capacitor to periodically discharge and provide a periodic signal.

22. The voltage-controlled oscillator of claim 21, wherein voltages VH and VL are provided as inputs to the voltage-controlled oscillator, and wherein the hysteretic comparator is configured to periodically turn the transistor on and off in response to a voltage VH at a first terminal of the resistor and a voltage VL at a second terminal of the resistor.

23. The voltage-controlled oscillator of claim 22, wherein the periodic signal comprises a voltage amplitude ranging between VH and VL, and wherein VH>VL>0V, VH=b*VIN+ VL, and b is less than or equal to 1.

24. The voltage-controlled oscillator of claim 21, wherein the current I is equal to b multiplied by VIN/R1, VIN is an input voltage to the oscillator, b is a scaling factor less than or equal to one, and R1 is a resistance.

25. The voltage-controlled oscillator of claim 24, wherein the resistor has a resistance equal to R1.

26. The voltage-controlled oscillator of claim 21, wherein the periodic signal is a periodic ramp signal.

27. A regulator, comprising:
power stage means for providing a regulator output in response to an input voltage;
controller means for controlling power to the power stage means;
reference voltage generator means for generating a reference voltage;
error amplifier means for receiving, as inputs, the reference voltage and a signal indicative of the regulator output and for providing a single-ended output proportional to a difference between the reference voltage and the signal indicative of the regulator output;
frequency compensation network means for receiving the amplifier output; and
a circuit path coupling the reference voltage generator means to the controller means, wherein the circuit path is substantially unaffected by any delay caused by the frequency compensation network means.

* * * * *